United States Patent
Chiang et al.

(10) Patent No.: US 7,436,092 B1
(45) Date of Patent: Oct. 14, 2008

(54) LOCKING STRUCTURE FOR AN UPPER COVER AND AN OUTER HOUSING OF A MOTOR

(75) Inventors: Hsin-An Chiang, Taichung (TW); Chia-Chun Wei, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 11/847,332

(22) Filed: Aug. 30, 2007

(51) Int. Cl.
*H02K 5/00* (2006.01)
(52) U.S. Cl. .................................................. 310/89
(58) Field of Classification Search ................. 310/88, 310/89, 91
See application file for complete search history.

(56) References Cited

U.S. PATENT DOCUMENTS

| | | | | |
|---|---|---|---|---|
| 4,716,326 | A | * 12/1987 | Fisher | 310/89 |
| 4,853,576 | A | * 8/1989 | Mayumi et al. | 310/239 |
| 2005/0079077 | A1 | * 4/2005 | Tsai et al. | 417/423.15 |
| 2007/0114168 | A1 | * 5/2007 | Hazlehurst | 210/416.2 |

* cited by examiner

*Primary Examiner*—Javaid Nasri
(74) *Attorney, Agent, or Firm*—Banger Shia

(57) ABSTRACT

A locking structure for an upper cover and an outer housing of a motor, the motor comprises an outer housing, an upper cover and at least two locking members. The upper cover is mounted on one end of the outer housing, and the locking members are locked in the outer housing by screws that pass through the upper cover, such that the upper cover and the outer housing are locked with each other stably and easily.

6 Claims, 5 Drawing Sheets

LOCKING STRUCTURE FOR AN UPPER COVER AND AN OUTER HOUSING OF A MOTOR

BACKGROUND OF THE INVENTION

1. Field of the Invention

The present invention relates to a locking structure for an upper cover and an outer housing of a motor, and more particularly to a locking structure for an upper cover and an outer housing of a motor which can be positioned stably and easily.

2. Description of the Prior Art

Referring to FIG. 1, a conventional assembling structure for an upper cover and an outer housing of a motor is shown, the upper cover 92 covers one end of the outer housing 90, and the other end of the outer housing 90 is locked with one end of the upper cover 92 by two screws 91.

However, the conventional structure has the following disadvantages:

Firstly, the upper cover 92 covers one end of the outer housing 90, but the upper cover 92 and the outer housing 90 are not defined with any restriction members, such that the screws 91 cannot be positioned precisely.

Secondly, it will cost a lot of time to position the screws 91 since the screws 91 are too long which have to pass through the outer housing 90, and such an arrangement is uneconomical.

The present invention has arisen to mitigate and/or obviate the afore-described disadvantages.

SUMMARY OF THE INVENTION

The primary objective of the present invention is to provide a locking structure for an upper cover and an outer housing of a motor which can be positioned stably and easily.

To achieve the object of the present invention, the motor comprises an outer housing, an upper cover and at least two locking members. The upper cover is mounted on one end of the outer housing. In the outer housing and near the upper cover are formed two opposite containing portions for insertion of the locking members. Two screws are passed through the upper cover and the locking members, such that the upper cover is locked with the outer housing stably and easily.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
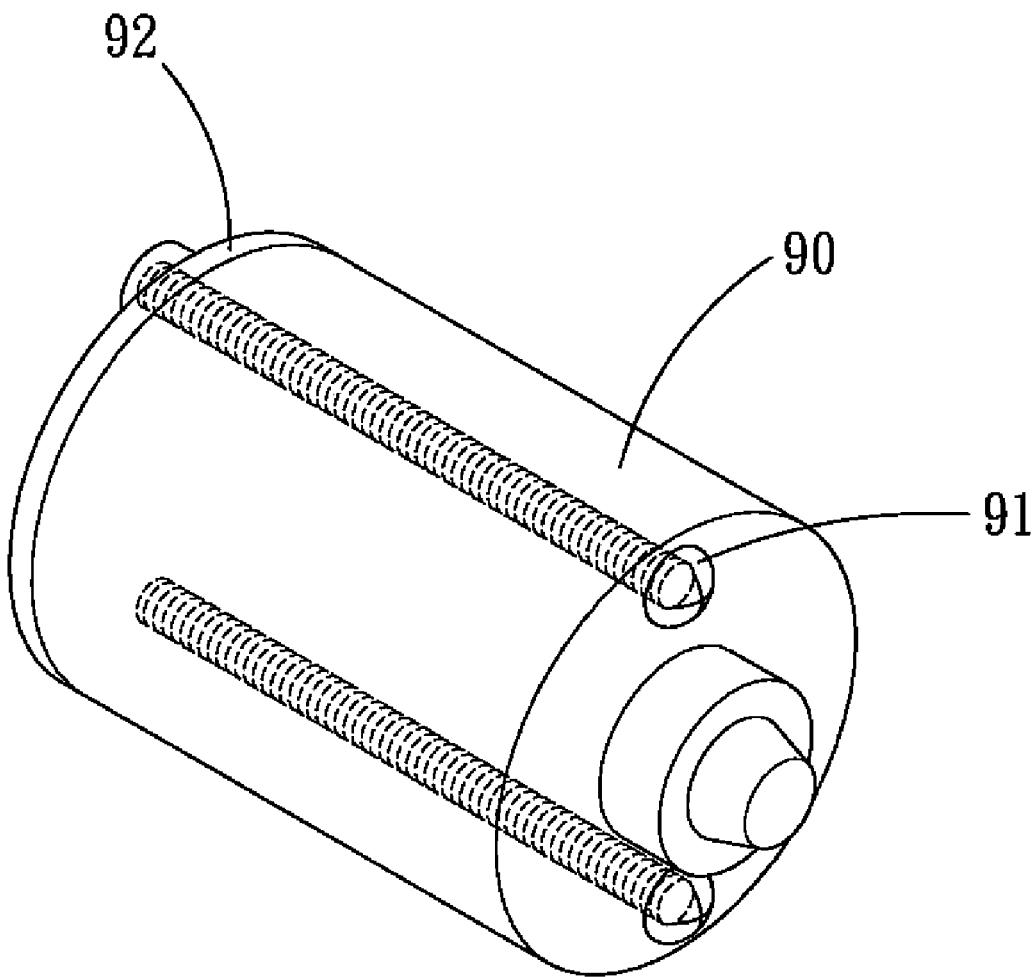
FIG. 1 is a perspective view of a conventional motor.
Figure 2:
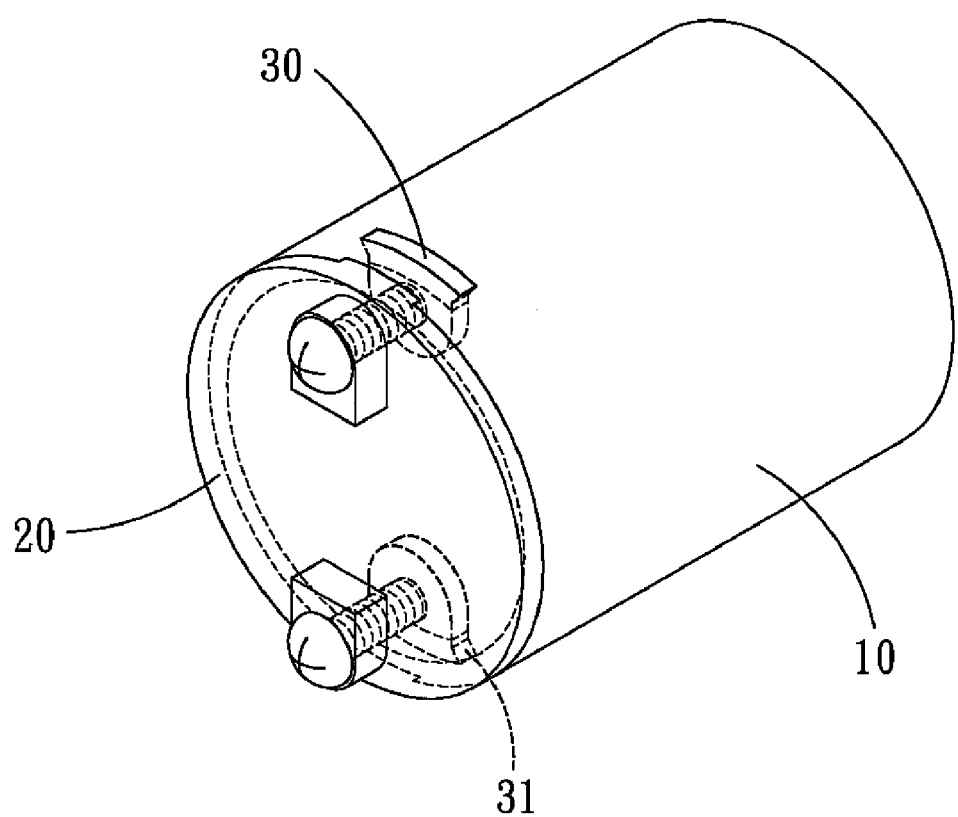
FIG. 2 is a perspective view of a locking structure for an upper cover and an outer housing of a motor in accordance with a first embodiment of the present invention.
Figure 3:
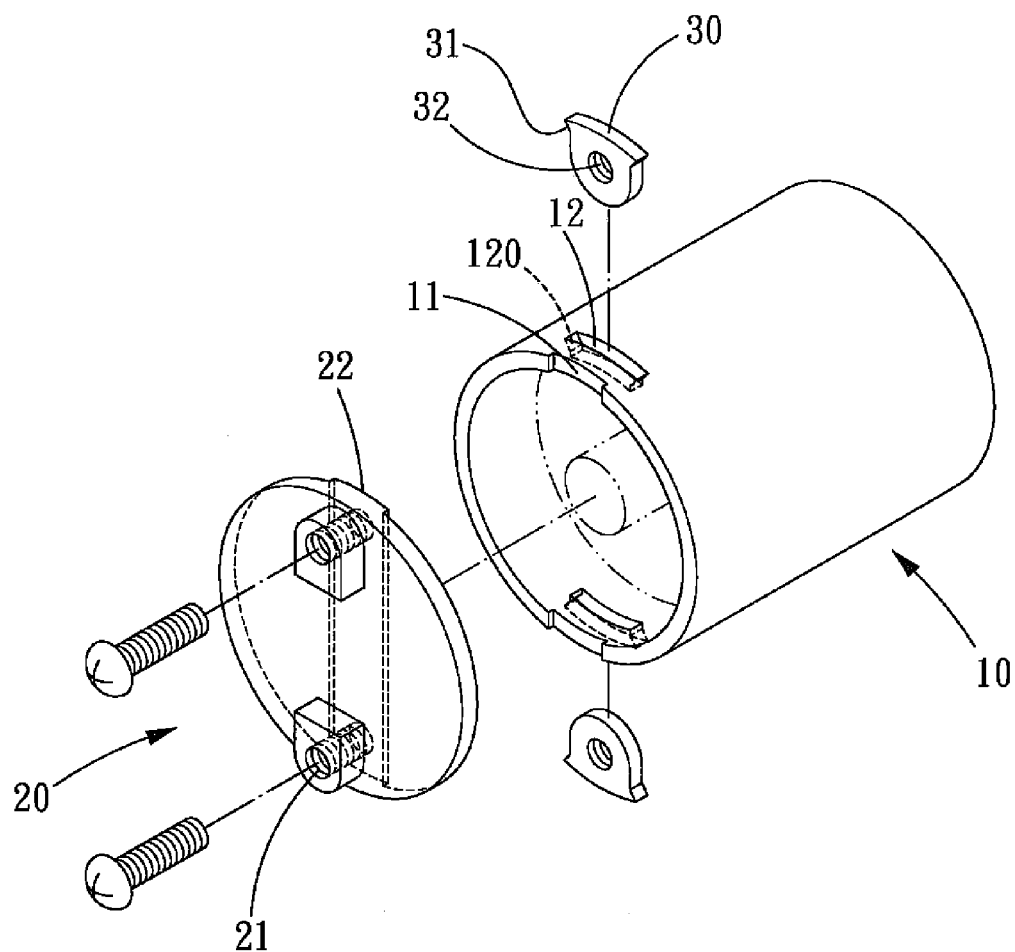
FIG. 3 is an exploded view of the locking structure for an upper cover and an outer housing of a motor in accordance with the first embodiment of the present invention.
Figure 4:
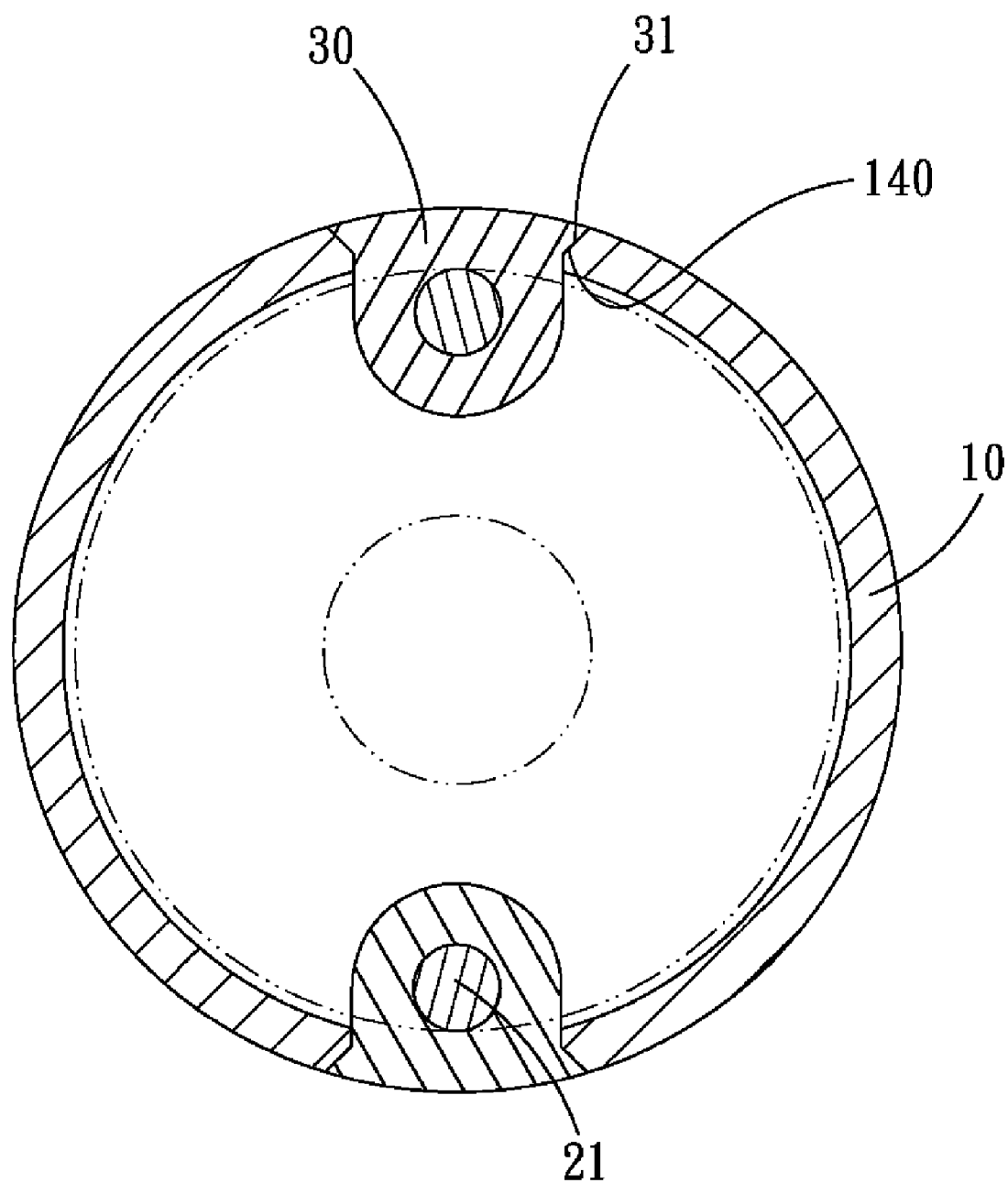
FIG. 4 is a cross sectional view of the locking structure for an upper cover and an outer housing of a motor in accordance with the first embodiment of the present invention.

Referring to FIGS. 2-4, a locking structure for an upper cover and an outer housing of a motor in accordance with a first embodiment of the present invention is shown, wherein the motor comprises an outer housing 10, an upper cover 20 and at least two locking members 30. The upper cover 20 is mounted on one end of the outer housing 10, and the locking members 30 are locked in the outer housing 10 by screws that pass through the upper cover 20, such that the upper cover 20 and the outer housing 10 are locked with each other stably and easily.

The outer housing 10 is in the shape of a hollow cylinder, and a free end of the outer housing 10 is formed with two opposite concave restriction portions 11 and two opposite penetrated containing portions 12. The restriction portions 11 are provided for restricting the upper cover 20, and the containing portions 12 are provided for insertion of the locking members 30, respectively. In addition, the locking members 30 are abutted against two abutting portions 120 formed in both ends of the containing portions 12, respectively.

The upper cover 20 is disc-shaped, and one end of the upper cover 20 is formed with two opposite circular-shaped penetrated portions 21 and a protruded rectangular-shaped restriction body 22. Two screws are passed through the penetrated portions 21 and the restriction body 22, and the penetrated portions 21 are located correspondingly to the containing portions 12 of the outer housing 10, respectively. And the restriction body 22 is engaged with the restriction portions 11 of the outer housing 10 for preventing relative movement between the upper cover 20 and the outer housing 10.

The locking members 30 are ellipse-shaped, and each locking member 30 is formed with two opposite oblique-angled abutting portions 31 and a circular-shaped threaded portion 32 with threads. The abutting portions 31 are abutted against the abutting portions 120 of the containing portions 12, such that the locking members 30 can be locked in the outer housing 10 by the screws that pass through the threaded portions 32.

Figure 5:
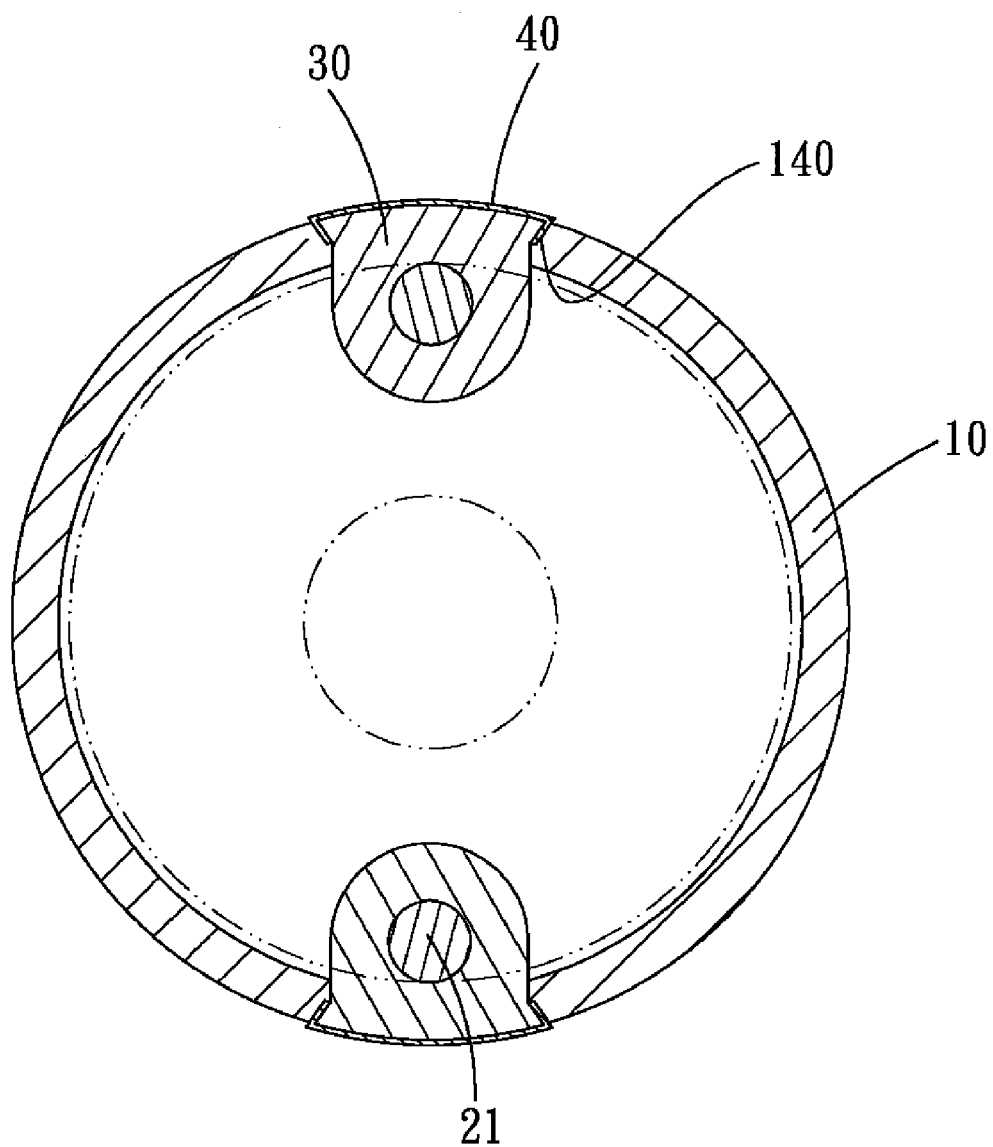
FIG. 5 is another cross sectional view of the locking structure for an upper cover and an outer housing of a motor in accordance with a second embodiment of the present invention.

Referring to FIG. 5, a locking structure for an upper cover and an outer housing of a motor in accordance with a second embodiment of the present invention is shown, a protection member 40 is mounted on the abutting portions 31 of each locking member 30 and is made of plastic, or rubber, or water-resistant material. Such an arrangement can protect the outer housing 10 of the motor and prevent the moisture from entering the motor, so as to prolong the life of the motor and to avoid the leakage of electricity.

It is apparent from the above-mentioned descriptions, the present invention has the advantages described as follows:

Firstly, the abutting portions 120 of the containing portions 12 of the outer housing 10 are disposed near the upper cover 20 to be abutted against the locking members 30, such that the locking members 30 can be positioned easily.

Secondly, the locking members 30 are passed through the abutting portions 120 of the containing portions 12 by screws, such that the locking members 30 can be positioned stably.

While we have shown and described various embodiments in accordance with the present invention, it should be clear to those skilled in the art that further embodiments may be made without departing from the scope of the present invention.

What is claimed is:

1. A locking structure for an upper cover and an outer housing of a motor, the motor comprising:

an outer housing having at least one restriction portion and one containing portion, the restriction portion being formed in a free end of the outer housing, the containing portion being located near the restriction portion;

an upper cover having at least one penetrated portion and one restriction body, the penetrated portion penetrating through the upper cover and the restriction body, the restriction body being located near the restriction portion of the outer housing;

at least two locking members each having at least one abutting portion and one threaded portion, the abutting portion being abutted against an abutting portion of the containing portion, and a screw being threaded in the threaded portion.

2. The locking structure for an upper cover and an outer housing of a motor as claimed in claim 1, wherein the upper cover is mounted on one end of the outer housing, and the locking member is locked in the outer housing by a screw that passes through one end of the upper cover.

3. The locking structure for an upper cover and an outer housing of a motor as claimed in claim 1, wherein the restriction portion is provided for restricting the upper cover, the containing portion is provided for insertion of the locking member, and the locking member is abutted against two abutting portions formed in both ends of the containing portions.

4. The locking structure for an upper cover and an outer housing of a motor as claimed in claim 1, wherein a screw is passed through the penetrated portion and the restriction body, the penetrated portion is located correspondingly to the containing portion of the outer housing, and the restriction body is engaged with the restriction portion for preventing relative movement between the upper cover and the outer housing.

5. The locking structure for an upper cover and an outer housing of a motor as claimed in claim 1, wherein the abutting portion of each locking member is abutted against the abutting portion of the containing portion, and the screw is threaded in the threaded portion.

6. The locking structure for an upper cover and an outer housing of a motor as claimed in claim 1, wherein a protection member is mounted on the abutting portion of the locking member and is made of plastic, or rubber material.

* * * * *